Dec. 13, 1966     A. V. WEASLER     3,290,918
METHOD OF MANUFACTURING A SHAFT COUPLING
Original Filed Dec. 6, 1963
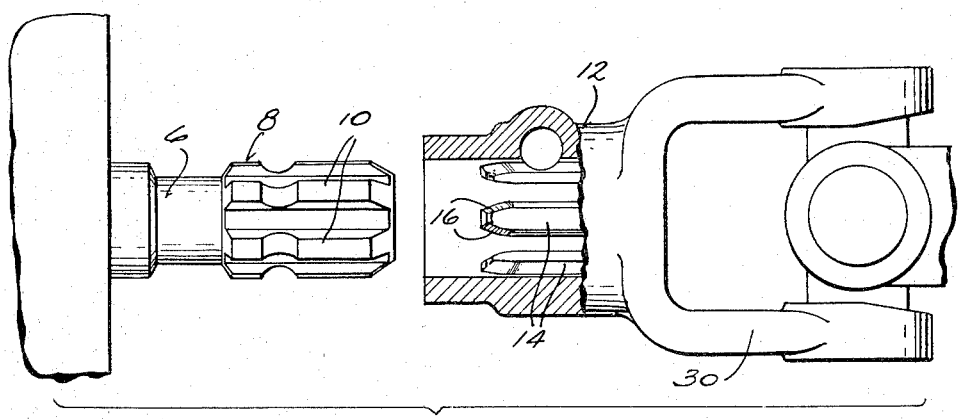
*Fig. 1*
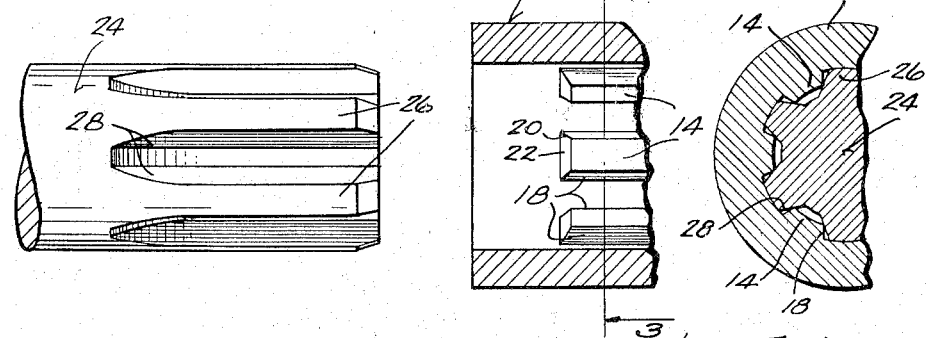
*Fig. 2*     *Fig. 3*
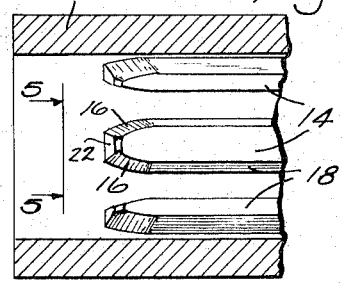     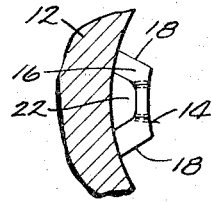
*Fig. 4*     *Fig. 5*
INVENTOR.
ANTHONY V. WEASLER
BY
Wheeler, Wheeler & Wheeler
ATTORNEYS

United States Patent Office 3,290,918
Patented Dec. 13, 1966

3,290,918
METHOD OF MANUFACTURING A SHAFT
COUPLING
Anthony V. Weasler, 603 Ridge Road, West Bend, Wis.
Original application Dec. 6, 1963, Ser. No. 328,745.
Divided and this application Sept. 13, 1965, Ser. No. 486,954
3 Claims. (Cl. 72—340)

This invention relates to a method of manufacturing a shaft coupling. This application is a division of my application 328,745, filed December 6, 1963, now Patent No. 3,249,377.

Many tractors and trucks are provided with power take-off shafts having terminal splined male coupling elements. The invention will be described with particular reference to power take-off shafts for driving implements from tractors and trucks, although the invention is applicable, in many aspects, to other drive shafts such as those which connect motors or engines to irrigation pumps or other equipment. Many implements with which such tractors and trucks are used have flexibly jointed and extensible driven shafts with female coupling elements applicable to the power take-off shaft. Inasmuch as neither the power take-off shaft nor the driven shaft can ordinarily be rotated by hand, it becomes a very difficult matter to register the splines of the respective coupling elements. If a tool is used to rotate the driven shaft, it is desirable that the operator know which direction of rotation will require the least movement to the point of registry.

Flexibly jointed and exensibly driven shafts for transmitting motion to an implement from the power take-off shaft of a tractor weigh as much as 70 to 80 pounds. Such shafts are commonly sold with the implement which is to be driven thereby. Usually, the output end of the assembly is attached to the implement before attempt is made to connect it to the tractor. In addition, there is sometimes a freewheeling guard enclosing and obscuring the assembly.

The operator may not be able to see the splines while trying to effect the assembly. Because of the weight of the shaft and the force necessary to telescope the components connected to the female member and, at the same time, to meet the necessity of registering the splines within a tolerance which is usually .002 to .006 inch, it is sometimes necessary to make five or ten attempts before registry is made.

For this purpose, the present invention contemplates that the female coupling element at the end of the driven shaft have the ends of its splines beveled or tapered, preferably by a swaging operation.

In the preferred practice of the invention, the coupling elements are splined in the usual manner. Conventionally, such splines have within .002–.006 inch of tolerance, according to ASAE standards. A tool is then employed in the preferred practice of the invention to taper the ends of the splines in the driven coupling element. For the purposes of the invention, the tapering of the ends of the splines is preferably done by a swaging operation so that the metal on one or both sides of the spline near its end is not only displaced progressively toward the center line but is actually compacted to provide the tapered guiding surfaces contemplated by the invention. Since this may result in some deformation of the ends of the splines, it is preferred that following the swaging operation a broaching or other machining operation be performed on the splined coupling element to eliminate any irregularities in the splines thereof.

In the drawings:
FIG. 1 is a view in plan fragmentarily illustrating a portion of a device from which a male power take-off coupling element projects, a portion of a universally jointed driven shaft being fragmentarily illustrated, with portions of the female coupling element broken away.

FIG. 2 is a view partially in plan and partially in section showing in mutually separated positions a swaging tool and the previously formed splines of the female coupling element, upon which said tool is about to act.

FIG. 3 is a view in section on line 3—3 of FIG. 2 showing the swaging tool in place in the female coupling element.

FIG. 4 is an enlarged fragmentary detail view fragmentarily showing a portion of the female coupling element after the splines thereof have been swaged.

FIG. 5 is a detail view taken in section on the line 5—5 of FIG. 4, a swaged spline being shown in end elevation.

The conventional power take-off shaft 6 has a male coupling element 8 at its end, such element being provided with splines 10. The length of splines 10 with reference to the exposed length of shaft 6 is broadly immaterial. The fact that the splines are shorter than shaft 6 in the illustration is strictly by way of example.

The female coupling element 12 of the universally jointed and extensible driven shaft is interiorly provided with splines 14 which, throughout the major portion of their length, are complementary to, and mate accurately with, the splines 10 of the driving coupling element of the power take-off shaft. However, in accordance with the present invention, each spline 14 has at least one and preferably both side surfaces taperingly convergent at 16 toward that end of the respective spline which is intended to be entered between two adjacent splines 10 in the assembly of the coupling elements.

As best shown in FIG. 2, the splines 14, as originally formed, may be square cut or involute throughout their length, the radial or involute side surfaces 18 forming a sharp angle at 20 with the oblique or square end surfaces 22 of the respective splines. However, in accordance with this invention, a taper 16 is provided. This may be done in any manner as by a swaging tool, which may be of the type indicated at 24 in FIG. 2, such tool having guide teeth 26 which enter as wedges between the splines 14 of the female coupling element. Such teeth progressively increase in width as shown at 28 in FIG. 2. If such a swage is used, when the hardened tool is driven into the female coupling element, the metal of each spline 14 confronted by the inclined side surface of a wedge is deformed or compacted at the ends of the splines to produce on each spline the convergent tapering surfaces 16. These are best illustrated in FIGS. 4 and 5.

The result is to increase the clearance between the splines of the female coupling element and the splines of the male coupling element by perhaps to sixty fold or more at the extreme ends of splines 14. While the splines may still meet head on in some circumstances, there is a greatly increased likelihood that when the operator extends the driven shaft to engage the female coupling element with the male coupling element of the power take-off shaft, the tapered ends of the splines 14 may enter between the splines 10 to a limited extent sufficient so that the operator can feel a camming thrust in one direction of rotation or the other. Whether or not a tool is available for rotating the driven shaft to the point of registry, a minimum rotation of such shaft will be required to achieve full mesh of the respective sets of splines.

The greater ease of operation is much appreciated by the operator. As noted above, parts are heavy and prior to this invention it was normal to make five to ten attempts to connect the female driven shaft to the male driving shaft before achieving success. With the device as herein disclosed, there is approximately ⅛ inch of taper on each side of the spline and it has been found that the assembly can almost invariably be achieved in the first attempt. Not only is this advantageous because of the saving of time, effort and temper, but because it may even be undesirable that the driven shaft be rotated prior to assembly, any more than is absolutely necessary.

I claim:

1. A method of making a female coupling element, which method consists in cutting splines in the interior of said element, and swaging the ends of the respective splines to form lateral surfaces which are convergent toward said ends, the metal of the swaged ends of the splines being displaced and compacted.

2. A method of making a tubular female coupling element, which method consists in cutting in the interior of a tubular element a set of peripherally spaced axially extending splines having ends which extend inwardly away from the end of the tubular element, and tapering the splines at corresponding ends by swaging the ends of the respective splines by axially introducing wedges between the spline side surfaces at the ends of consecutive splines to compact the metal of the splines and to cause the lateral surfaces thereof to be convergent toward the ends of respective splines.

3. A method according to claim 2 in which all splines of the female coupling element are swagged concurrently, and the splines are subsequently machined to eliminate any malformation resulting from the swaging operation.

References Cited by the Examiner
UNITED STATES PATENTS

| 1,907,897 | 5/1933 | Swegles | 72—340 |
| 2,066,372 | 1/1937 | Tomalis | 72—324 |
| 2,340,529 | 2/1944 | Hartman | 76—114 |
| 3,073,192 | 1/1963 | Beers | 287—119 |
| 3,124,377 | 3/1964 | O'Brien et al. | 287—53 |

FOREIGN PATENTS

| 651,603 | 4/1951 | Great Britain. |

CHARLES W. LANHAM, *Primary Examiner.*

W. H. JUST, *Assistant Examiner.*